US010178126B2

(12) United States Patent
Ahmed Assem A. S. et al.

(10) Patent No.: US 10,178,126 B2
(45) Date of Patent: Jan. 8, 2019

(54) ACTIVITY-BASED RISK SELECTION OF OPEN WI-FI NETWORKS

(71) Applicant: International Business Machines Corporation, Armonk, NY (US)

(72) Inventors: Hitham Ahmed Assem A. S., Dublin (IE); Al Chakra, Durham, NC (US); Jonathan Dunne, County Waterford (IE); Liam Harpur, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/753,568

(22) Filed: Jun. 29, 2015

(65) Prior Publication Data
US 2016/0381074 A1 Dec. 29, 2016

(51) Int. Cl.
*H04L 9/00* (2006.01)
*H04L 29/06* (2006.01)
*H04W 12/08* (2009.01)
*H04W 84/12* (2009.01)

(52) U.S. Cl.
CPC .......... *H04L 63/20* (2013.01); *H04L 63/1433* (2013.01); *H04W 12/08* (2013.01); *H04W 84/12* (2013.01)

(58) Field of Classification Search
CPC ...................................................... H04L 63/20
See application file for complete search history.

(56) References Cited

U.S. PATENT DOCUMENTS

| 2006/0067285 A1* | 3/2006 | Caspi | H04L 67/24 370/338 |
| 2014/0250533 A1* | 9/2014 | Basavapatna | H04W 4/02 726/25 |
| 2016/0087952 A1* | 3/2016 | Tartz | H04W 12/06 455/411 |

OTHER PUBLICATIONS

Appendix P, Jun. 29, 2015.

* cited by examiner

*Primary Examiner* — Christopher J Brown
(74) *Attorney, Agent, or Firm* — Garg Law Firm, PLLC; Joseph Petrokaitis

(57) ABSTRACT

For activity-based risk assessment of open Wi-Fi networks, an activity occurring at a consumer application is analyzed to determine that a connection with a first open Wi-Fi network is to be used in conjunction with the activity. From an entry representing the activity in a risk profile, a risk level of the activity is selected. Whether an overall risk value of the first network exceeds the risk level of the activity is determined. When the overall risk value of the first network exceeds the risk level of the activity, the connection with the first network is terminated. A second open Wi-Fi network with a second overall risk value that does not exceed the risk level of the activity is selected. A second connection with the second network is established. The activity is allowed to proceed using the second connection with the second network.

18 Claims, 8 Drawing Sheets

ACTIVITY-BASED RISK SELECTION OF OPEN WI-FI NETWORKS

TECHNICAL FIELD

The present invention relates generally to a method, system, and computer program product for using open Wi-Fi connections. More particularly, the present invention relates to a method, system, and computer program product for activity-based risk selection of open Wi-Fi networks.

BACKGROUND

Users with portable computing devices often find themselves looking for data connectivity at a variety of locations. Particularly, users prefer to connect using a Wi-Fi network that is open or available for guest users to use, as compared to a cellular data network, which often comes at a cost to the users.

Many businesses and other establishments offer free Wi-Fi to attract patrons. It is not uncommon to detect many open Wi-Fi networks at a given location.

Different Wi-Fi networks are configured differently to allow users to connect to those networks. Many Wi-Fi network configurations are not desirable for a variety of reasons. Users generally do not know any more about an open Wi-Fi network than whether the Wi-Fi network is secure or open. Because only authorized users, or users with the security key can access, guest users are relegated to open Wi-Fi networks with nothing more than a warning that the network the user is connect to is not secured.

SUMMARY

The illustrative embodiments provide a method, system, and computer program product for activity-based risk selection of open Wi-Fi networks. An embodiment includes a method for activity-based risk assessment of open Wi-Fi networks. The embodiment analyzes, using a processor in a mobile data communication device, an activity occurring at a consumer application, to determine that a connection with a first open Wi-Fi network is to be used in conjunction with the activity. The embodiment selects, from an entry representing the activity in a risk profile, a risk level associated with the activity. The embodiment determines whether an overall risk value of the first open Wi-Fi network exceeds the risk level associated with the activity. The embodiment terminates, responsive to the overall risk value of the first open Wi-Fi network exceeding the risk level associated with the activity, the connection with the first open Wi-Fi network. The embodiment selects a second open Wi-Fi network with a second overall risk value that does not exceed the risk level associated with the activity. The embodiment establishes a second connection with the second open Wi-Fi network. The embodiment allows the activity to proceed using the second connection with the second open Wi-Fi network.

Another embodiment includes a computer usable program product comprising a computer readable storage device including computer usable code for activity-based risk assessment of open Wi-Fi networks.

Another embodiment includes a data processing system for activity-based risk assessment of open Wi-Fi networks.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
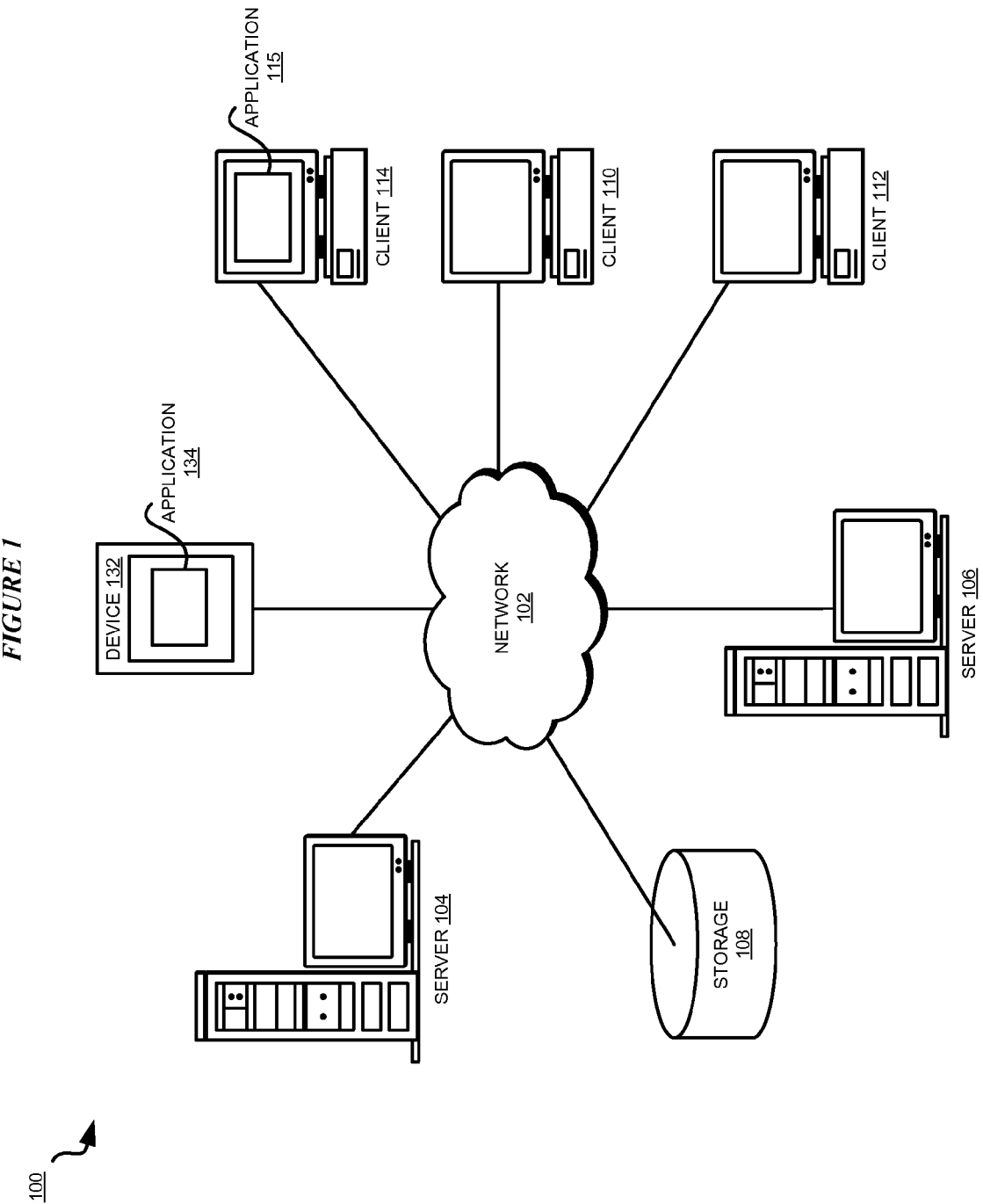
FIG. 1 depicts a block diagram of a network of data processing systems in which illustrative embodiments may be implemented.

The illustrative embodiments recognize that connecting to an open Wi-Fi network is fraught with risks. For example, user data that is transmitted over an open Wi-Fi network is susceptible to packet snooping and other malicious actions. As another example, connecting to an open Wi-Fi network can also open backdoors into the user's device and the data contained thereon. Malicious software can be downloaded or installed on the user's device over open Wi-Fi networks, and relentless advertising and popup messages can hinder or prevent productive use of the user's device.

The illustrative embodiments further recognize that most users are not technology savvy enough or well equipped enough to be able to indulge in a detailed audit of an open Wi-Fi network before performing transactions and other operations over that network. Even if an open Wi-Fi network has more risk factors associated therewith than a user would prefer, the user often cannot uncover those risk factors to determine whether to connect with that network.

The illustrative embodiments also recognize that even when a user has a bad experience with an open Wi-Fi network, that experience and the knowledge of the undesirability of the open Wi-Fi network remains with the user. Presently, another user has no way of benefiting from a previous user's experience with the open Wi-Fi network so that the other user may avoid connecting with an open Wi-Fi network that may be malicious or risky.

Presently, a user can elect to connect or not connect with certain open Wi-Fi networks. For example, the user can configure a device such that certain Wi-Fi networks are remembered or saved for future connections, some require user's express permission or input to connect, and the user can specify whether to attempt connections with any open Wi-Fi networks at all. However, a user presently cannot specify how to measure an open Wi-Fi network's overall risk value, which risk factors or risk elements associated with an open Wi-Fi network are acceptable to a user, and what the user's risk tolerance threshold might be with respect to an overall risk of connecting with an open Wi-Fi network.

The illustrative embodiments further recognize that not only do different open Wi-Fi networks carry different amounts of risk, but also that different open Wi-Fi networks may be acceptable for connection depending upon an activity the user wishes to perform using the connection.

The illustrative embodiments used to describe the invention generally address and solve the above-described problems and other problems related to using open Wi-Fi networks. The illustrative embodiments provide a method, system, and computer program product for activity-based risk selection of open Wi-Fi networks.

One or more embodiments described herein can be implemented as an application executing using a processor and a memory in mobile device associated with a user. Any reference to a "network" is a reference to an open Wi-Fi network, and "open Wi-Fi network" and "network" are used interchangeably unless expressly specified otherwise where used.

The illustrative embodiments recognize that the activity-based risk assessment of open Wi-Fi connectivity falls largely into two categories—(i) when the user has already performed an activity on a device, and a Wi-Fi connection has to be selected for that activity; and (ii) the user performs an activity after a Wi-Fi connection is already established. In scenario (i), an open Wi-Fi network has to be selected such that the risk associated with the Wi-Fi network is not greater than a risk acceptable for the activity. In scenario (ii), the Wi-Fi network can be used for the activity if the risk associated with the Wi-Fi network is equal to or lower than a risk acceptable for the activity, and the Wi-Fi network used for the existing connection has to be changed if the risk associated with the Wi-Fi network is greater than a risk acceptable for the activity.

As an example of scenario (i), suppose that a user receives a text message over a cellular channel. The text message is from the user's financial advisor and states, "OK, you account is now set up and you can go ahead and fund it." The user reads the text message and thereafter, attempts to connect to an open Wi-Fi network. When an activity has already occurred, such as in scenario (i), based on which an open Wi-Fi network has to be selected for Wi-Fi connectivity, an embodiment analyzes the activity. In the example case of scenario (i) described above, the activity includes data of a text message, and the activity—the reading of the text message—occurred within a certain period prior to the attempt to connect with an open Wi-Fi network.

Only as a non-limiting example, the analysis can take the form of Natural Language Processing (NLP). In the example case of scenario (i) described above, using NLP based analysis of the data of the activity, the embodiment determines that the reason for the request to establish a Wi-Fi connection over the open Wi-Fi network is to complete a financial transaction.

Similarly, other activities of the user also involve one or more other consumer applications, the text messaging application being one such consumer application. A consumer application can produce textual, numeric, or alphanumeric data, which can be analyzed using suitable tools to determine an identity of the consumer application, the activity occurring using the consumer application, a nature (type) of the activity, or some combination thereof. For example, a user trying to login to a social media website produces data from which the browser on the device can be identified as the consumer application, and the Uniform Resource Locator (URL) of the social media website can reveal the nature or type of the activity—e.g., social interaction, and the activity—e.g., a post operation of a social media status message.

These example types of data, activities, natures or types of activities, transactions, consumer applications, and analyses are not intended to be limiting. From this disclosure, those of ordinary skill in the art will be able to conceive many other types of data, activities, natures of activities, transactions, consumer applications, and analyses and the same are contemplated within the scope of the illustrative embodiments.

Furthermore, the activity need not be limited to activities occurring locally on the device where an embodiment is executing. The activity can occur on another device that is tethered with the device where an embodiment is executing. The tethered device or a consumer application therein produces data in response to an activity occurring on the tethered device. Such data is available over the wired or wireless tethering network to the device of the embodiment, and the device of the embodiment has to establish the Wi-Fi connectivity with an acceptable risk level for the activity on the tethered device. An embodiment analyzes the data of an activity in a manner described herein to identify the consumer application, the activity, the nature or type of the activity, or some combination thereof.

Once an embodiment identifies the consumer application, the activity that has occurred, a nature of the activity, or some combination thereof, the embodiment determines a risk level that can be tolerated for that activity. One example embodiment maintains, or otherwise has access to, a risk profile. A risk profile is a data structure that is stored anywhere such that the device has access to the data structure without requiring Wi-Fi connectivity, including but not limited to storing locally on the device. A risk profile describes, lists, or otherwise configures different risk levels associated with different activities, different risk levels associated with different natures of activities, or both.

For example, an activity may be a login request. A nature or type of the activity may be "financial transaction" if the login is to a financial institution's website. Another nature or type of the activity may be "social transaction" if the login is to a social media website. As another example, an activity may be a send operation for an email. A nature of the activity may be "business email" if the email is being sent to a corporate mailbox of the user's supervisor. Another nature of the activity may be "personal email" if the email is being sent to a personal mailbox of a friend. As another example, an activity may be a connect operation for network. A nature of the activity may be "secure connection" if the connection is being made with a corporate Virtual Private Network (VPN). Another nature of the activity may be "unsecure connection" if the connection is being made with a user's home network.

As can be seen, an activity can fall under different natures of activities depending upon the specific data of the activity. In some cases, the analysis can identify the consumer application, the activity, and the nature of the activity. In other cases, only one or two of these three factors may be determined from the analysis.

A risk profile according to an embodiment can include several types of risk level entries. For example one type of risk level entry defines an acceptable risk level when an activity is detected in a certain consumer application. Another example type of risk level entry defines an acceptable risk level for a specific activity. Another example type of risk level entry defines an acceptable risk level for a specific nature of activities. When more than one factor is known from an analysis, e.g., when an activity and a nature of the activity are both determined, and more than one entry in the risk profile are usable for determining the acceptable risk level, an embodiment selects the lowest risk level from all the matching entries as the acceptable risk level.

These examples of manners of defining and using risk level entries are not intended to be limiting. From this disclosure, those of ordinary skill in the art will be able to conceive many other manners of defining and using risk level entries and the same are contemplated within the scope of the illustrative embodiments.

If one or more risk level entries exist in the risk profile for the identified consumer application, the activity, the nature of the activity, or some combination thereof, an embodiment determines a risk level that can be tolerated for that activity using such one or more entries. If no entry corresponding to any of these three factors is found in a given risk profile, the embodiment selects a default or catch-all risk level configured in the risk profile.

One embodiment attempts through additional analysis whether the identified consumer application behaves or appears similar to another consumer application, which does have a risk level entry configured in the risk profile. Similarly, additional analysis can determine whether the identified activity appears similar to another activity which does have a risk level entry configured in the risk profile; or whether the identified nature of the activity appears similar to another nature of an activity, which does have a risk level entry configured in the risk profile. When a look-alike of the identified consumer application, activity, or nature of activity can be found, an embodiment uses the one or more risk level entries associated with such look-alike(s) to determine a risk level can be tolerated for that activity using such one or more entries.

As described earlier, in scenario (ii), an activity occurs in the device of an embodiment or a tethered device, after connectivity to an open Wi-Fi network has been established. The already established connectivity to an open Wi-Fi network can be used for the activity if the risk associated with the Wi-Fi network is equal to or lower than a risk acceptable for the activity. The Wi-Fi network used for the existing connection has to be changed if the risk associated with the Wi-Fi network is greater than a risk acceptable for the activity.

As an example of scenario (ii), suppose that an email arrives using an existing connection for a user from his financial advisor. The user reads the email, which states, "OK, you account is now set up and you can go ahead and fund it." The user proceeds to open his financial application. An embodiment recognizes the email application and the financial application as consumer applications, analyzes the email message data to determine a nature of the activity that is predicted to occur next from the financial application, to wit, a financial transaction. For example, one embodiment analyzes the combination of reading the email activity, analyzing the data of the email, opening a financial application, the user responding by another email saying, "I am about to send you $200 via xyz service" or something similar, to determine that the activity that is going to occur next will have a different risk level threshold than the already occurred activity of reading an email.

If the risk level of the open Wi-Fi network used in the existing connection is equal to or lower than the risk level threshold of the planned or predicted activity, an embodiment allows the predicted activity to continue over the existing connection. If, however, the risk level of the open Wi-Fi network used in the existing connection exceeds the risk level threshold of the planned or predicted activity, an embodiment prevents the predicted activity, the financial transaction activity in the above example, from using the existing connection.

The embodiment determines whether an open Wi-Fi network is available whose risk is equal to or lower than the risk level of the predicted activity. If such an open Wi-Fi network is available, the embodiment terminates the existing connection to the currently used open Wi-Fi network and attempts to establish a connection using the open Wi-Fi network whose risk is equal to or lower than the risk level of the predicted activity. The embodiment allows the planned activity to proceed using the new connection, once the new connection is established using the open Wi-Fi network whose risk is equal to or lower than the risk level of the predicted activity.

One embodiment also notifies the user about the risk with the existing connection, the termination process, the preventing of the predicted activity, and the availability of the new connection with lower risk. One embodiment also allows the user to override or change the risk assessments, the risk level determination of the already-occurred activity or a predicted activity, the connection termination, the establishing of a new lower-risk connection, or some combination thereof.

The analytical processes described and contemplated with the action-before-connection circumstances of scenario (i) can similarly be used with action-after-connection circumstances of scenario (ii). The manners of defining and using a risk profile described and contemplated with the action-before-connection circumstances of scenario (i) can similarly be used with action-after-connection circumstances of scenario (ii).

Some considerations in establishing a network connection using open Wi-Fi networks and assessing the risks associated therewith are now described using some example embodiments—

An embodiment detects the availability of one or more open Wi-Fi networks at a location of the device. The embodiment is configured with a set of risk elements, which can be evaluated for open Wi-Fi networks. One embodiment is configured to select all or a default subset of the risk elements and analyze the open Wi-Fi network for assessing values corresponding to the selected risk elements. Another embodiment allows a user to select all or a subset of the risk elements and to analyze the open Wi-Fi network for assessing values corresponding to the selected risk elements.

A risk level, such as a risk level of an open Wi-Fi network, a risk level associated with a consumer application or an activity, or a risk level in an entry in a risk profile can be defined using one or more risk elements. For example, a risk level can be defined as a particular value of a particular risk element. As another example, a risk level can be defined as a set of particular values of a set of particular risk element. As another example, a risk level can be defined as a computed value based on a set of values of a set of risk element.

These examples of manners of setting or determining a risk level are not intended to be limiting. From this disclosure, those of ordinary skill in the art will be able to conceive many other ways of determining risk levels and the same are contemplated within the scope of the illustrative embodiments.

A variety of risk elements can be associated with an open Wi-Fi network. Some non-limiting examples of the risk elements include but are not limited to a type of encryption that is supported, a communication or security protocol that the network supports, a type of security key that can be used to access the network, a stability of the network signal, a speed or throughput of the network, a channel used by the network, a type of data carrier network that exists beyond the Wi-Fi access point with which the device connects, an internet service provider (ISP) that services the network, a location of the ISP, a Domain Name Server (DNS) used by the network, and the like.

As an example, a type of encryption that is supported can become a risk element of a network when the network or a server therein does not support a type of data encryption that the user prefers. For example, the network or a server therein may support digital signatures but not public key encryption of user content.

As an example, a communication or security protocol that the network supports can become a risk element of a network when the network or a server therein does not support a communication or security protocol that the user prefers. For example, the network or a server therein may support telnet but not secure shell (SSH).

As an example, a type of security key that can be used to access a network can become a risk element of the network when the network or a server therein does not support a type of security key that the user prefers. For example, the network or a server therein may support key length of 64 bits but not 128 bits.

As an example, a stability of the network signal can become a risk element of the network when the network signal changes, fades, or drops out intermittently. For example, the network signal may vanish while the user is in the middle of a transaction causing data loss or data corruption.

As an example, a speed or throughput of the network can become a risk element of the network when the network or a server therein does not support a data rate the user prefers. For example, the latency in the network or a server therein may cause user transactions to timeout causing data loss or data corruption.

As an example, a channel used by the network can become a risk element of the network when the network does not use a communication channel that the user prefers. For example, the user may prefer a certain Wi-Fi channel number for some user-specific reason but the network may use only on a different channel.

As an example, a type of data carrier network that exists beyond the Wi-Fi access point with which the device connects can become a risk element of the network when the network or a server therein does not support or use a type of data carrier network that the user prefers. For example, the network may be supported by a cellular data network at a router behind the Wi-Fi access point but the user may want to connect only on an optical fiber based network.

As an example, an ISP that services the network can become a risk element of the network when the ISP is other one or more ISPs that the user prefers. For example, the network or a server therein may use a local small ISP whereas the user may prefer a large well known ISP.

As an example, a location of the ISP can become a risk element of the network when the location of the ISP is other than a location that the user prefers. For example, the network or a server therein may use an ISP based in a foreign country whereas the user may prefer a domestic ISP.

As an example, a DNS used by the network can become a risk element of the network when the DNS is not preferred by the user. For example, the network or a server therein may use a DNS that is privately hosted by an establishment whereas the user would prefer to use a well known publicly available DNS.

Depending upon the risk element that is selected for evaluating a network, an embodiment selects an appropriate analysis procedure for that risk element. Some analysis procedures can be executed before connecting to the open Wi-Fi network, whereas some other analysis procedures require a connection with the network to determine a value for the corresponding risk element. For example, while a procedure to determine a supported key length can be performed without connecting with the network—i.e., pre-connection, a procedure to determine which ISP is servicing the network can be executed once a connection has been established, i.e., post-connection.

As some more examples, channel and stability related risk elements can be determined pre-connection, post-connection, or both. The DNS can be identified by configuring the analysis procedure with a command or operation, which when executed post-connection reveals the identity of the DNS. The analysis procedure then compares the identified DNS with a list of preferred DNS to assess the corresponding risk element.

Similarly, the type of network at a router behind the access point can be identified by configuring the analysis procedure with a suitable command or operation, which when executed post-connection reveals the type of the network either directly or behaviorally. The analysis procedure then compares the identified network or behavior with a list of preferred networks or behaviors to assess the corresponding risk element. Other analysis procedures for other risk elements can similarly be configured to execute pre-connection, post-connection, or both, depending on the information needed for the analysis and the manner of reaching the location of such information.

The above-described example risk elements will enable those of ordinary skill in the art to configure many other risk elements in a similar manner, and such other risk elements are contemplated within the scope of the illustrative embodiments. Furthermore, given a risk element, different implementations can adopt or design different analysis procedures for evaluating the risk element. The analysis procedures can be too numerous and too vastly diversified to even list in this disclosure. From this disclosure, those of ordinary skill in the art to configure many analysis procedures for many types of risk elements, and such other procedures are contemplated within the scope of the illustrative embodiments.

An analysis procedure produces a value for a corresponding risk element relative to a network. The risk value can be a binary value or a value on a suitable scale. For example, if the DNS used by the network is or is not on a user's preferred DNS list, then the analysis procedure may produce a Yes (1) or a No (0) value. As another example, if the throughput of the network is 50 Kilobits per second (KBPS), and the user-defined 1-10 throughput scale is from 10 KBPS (lowest at 1) to 15 Megabits per second (MBPS) (highest at 10), the value of the throughput risk element would be somewhere between 1 and 2 on the 1-10 scale.

An embodiment evaluates all selected risk elements by performing their corresponding analysis procedures. If an analysis procedure requires a connection with the network, the embodiment establishes the connection but prevents user activity over that connection until the analysis of the network's risk is complete and the embodiment has determined that the network poses acceptable risk according to a user-configured risk threshold. If the network poses acceptable risk according to the user-configured risk threshold, such as when an overall risk value of the network is at or below a risk value threshold set by default or set by the user, the embodiment allows the user activity to proceed over the network. If the network poses unacceptable risk according to the user-configured risk threshold, such as when an overall risk value of the network exceeds the risk value threshold set by default or set by the user, the embodiment terminates the connection with the network without allowing the user activity to proceed over the network.

An embodiment combines the separate risk values determined from the separate analysis procedures for the selected risk elements. The combining of the several risk values to yield an overall risk value can be performed using any logic suitable for an implementation. An overall risk value is usable as a risk level.

As a simple example, binary values can be combined by determining whether there are more favorable binary answers than unfavorable, and outputting a combined value as favorable (1) if so, and unfavorable (0) otherwise. As another simple example, risk values on similar scales can be averaged to produce an overall value on the same scale. Risk values on different scales, including binary values, can be combined using some baselining or normalization method. Different risk elements can carry different weights, and their values can be weighted accordingly in the computation of the overall value.

These examples of risk values, weights, scales, and methods of combining are not intended to be limiting. From this disclosure, those of ordinary skill in the art will be able to conceive many other forms of risk values, weights, scales, and methods of combining, and the same are contemplated within the scope of the illustrative embodiments.

An embodiment further visualizes for the user the overall risk value assessment of an open Wi-Fi network. In one example embodiment, the overall risk value is color coded according to a color chart. The color chart can be user-configured or set by default. The color chart provides a color to represent a risk value. The overall risk value is assigned the corresponding color from the color chart. The embodiment uses the assigned color to color a graphical icon or image, a text of the network information, or some other aspect of the network that is visually perceptible to the user. Font size, font style, bolding, underlining, blinking, shading and many other ways of visualizing the overall risk value can similarly be used within the scope of the illustrative embodiments.

An embodiment further allows the information about the open Wi-Fi network and the overall risk value assessed for the network to be recorded in a repository. The repository is available to one or more other users such that another user can receive a previous user's evaluation of the network before connecting to the network. The repository can take the form of a database, a website, a social media page, or any other suitable form. When such a repository is available to an embodiment, the embodiment considers the published overall risk values of a network instead of or in conjunction with other analysis procedures as described herein.

A method of an embodiment described herein, when implemented to execute on a device or data processing system, comprises substantial advancement of the functionality of that device or data processing system in safely using open Wi-Fi networks. For example, prior-art only presents a list of networks to a user from which the user has to select a network without knowing the risks associated with that network. Such a selection is essentially unaware of the risks associated with an open Wi-Fi network or the suitability or unsuitability of a particular open Wi-Fi network for a particular activity. An embodiment dynamically analyzes one or more configurable risk elements associated with the network, and presents to the user the results of the analysis in an easy to understand manner. Based on the dynamic analysis of the open Wi-Fi networks, an embodiment further determines whether the Wi-Fi network is suitable for an activity that has already occurred or is predicted to occur. Such manner of evaluating risks of open Wi-Fi networks and determining their suitability for particular activities is unavailable in presently available devices or data processing systems. Thus, a substantial advancement of such devices or data processing systems by executing a method of an embodiment is achieved by managing the risks associated with open Wi-Fi networks in an informed manner thereby increasing the safety and security of user data in using such networks.

The illustrative embodiments are described with respect to certain consumer applications, activities, natures of activities, prediction logic, risk levels, risk elements, analysis procedures, commands and operations, risk values, thresholds, tolerances, methods of computing, visualization, repository, tethering devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
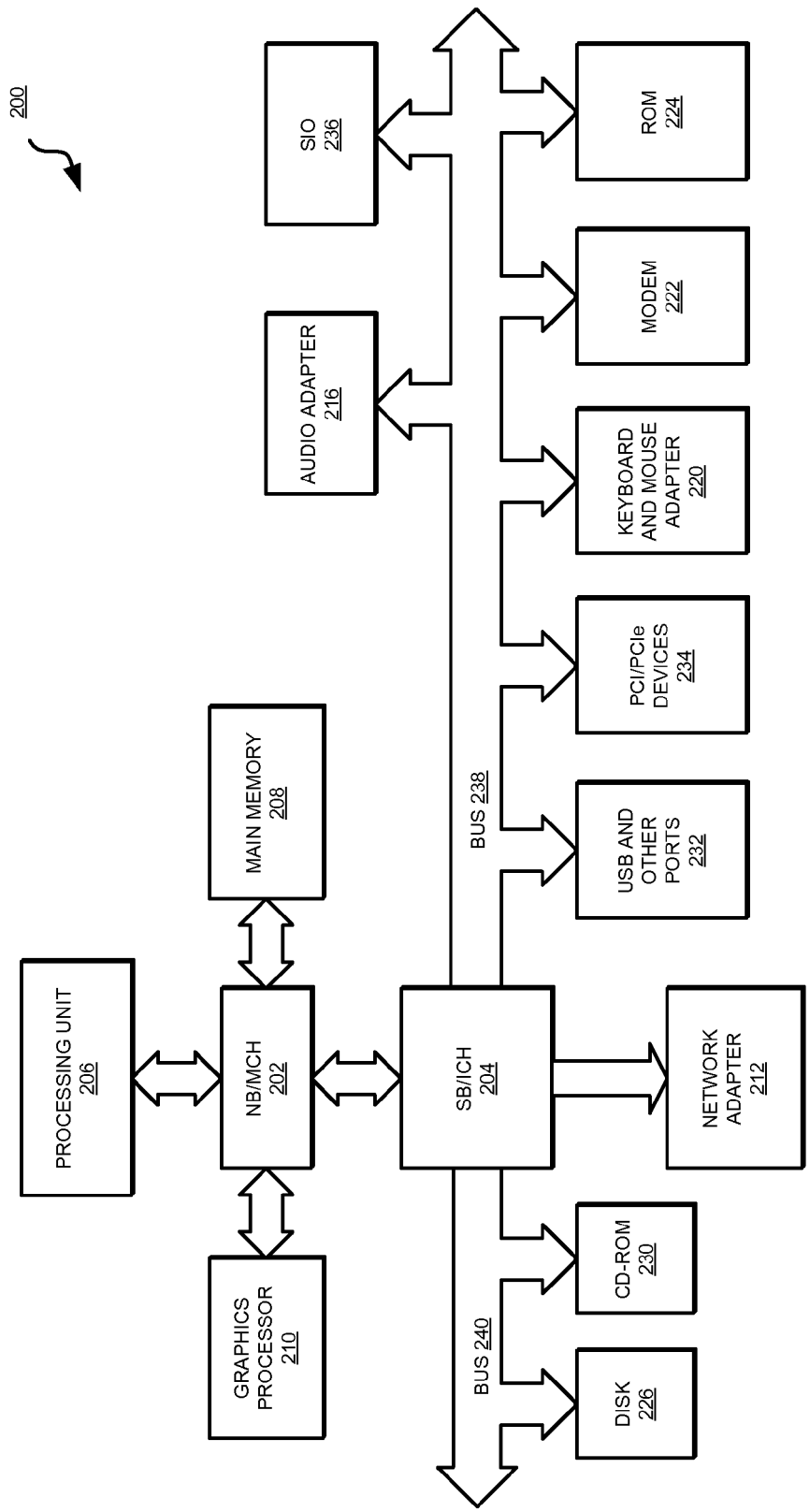
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Network 102 may be an open Wi-Fi network with which client 114 or device 132 attempts to establish data connectivity. When a user's device takes the form of client 114, which as an example may be a laptop computer, application 115 implements an embodiment described herein. When device 132 operates as a user's device, application 134 implements an embodiment described herein.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as applications 115 and 134 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
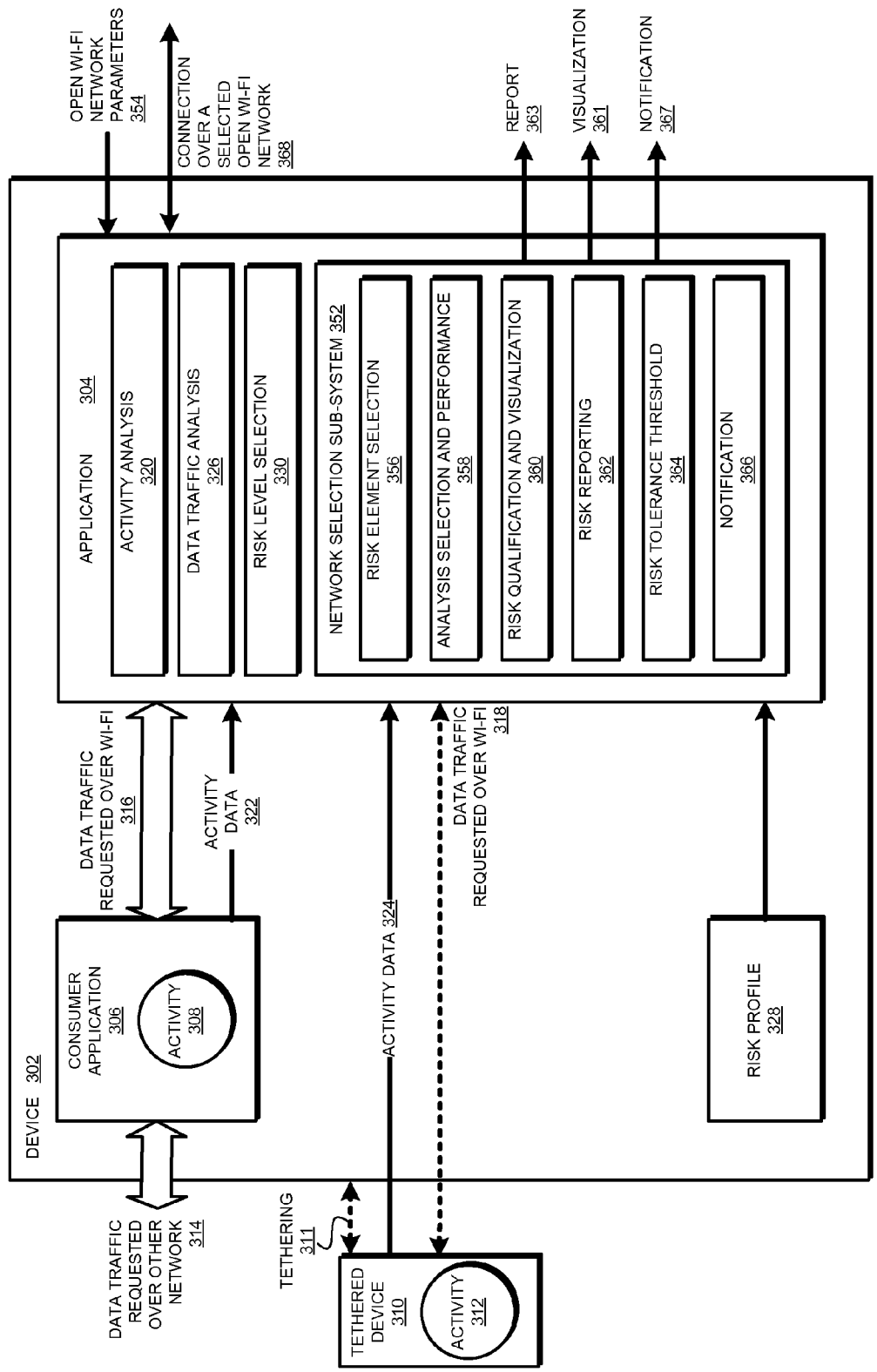
FIG. 3 depicts a block diagram of an example configuration for risk assessment of an open Wi-Fi network in accordance with an illustrative embodiment.

With reference to FIG. 3, this figure depicts a block diagram of an example configuration for risk assessment of an open Wi-Fi network in accordance with an illustrative embodiment. Device 302 is an example of device 132 or client 114 in FIG. 1. Application 304 is an example of application 134 or application 115 in FIG. 1.

Consumer application 306 is an application executing on device 302. Activity 308 is an activity occurring using consumer application 306. For example, activity 308 may be an activity that has occurred before application 304 establishes a connection with an open Wi-Fi network, such as in scenario (i) described earlier. As another example, activity 308 may be an activity that is planned or predicted, and for which application 304 has to establish a connection with an open Wi-Fi network, such as in scenario (ii) described earlier.

Tethered device 310 may be tethered via wired or wireless tethering 311 to use data connectivity available at device 302. Activity 312 may occur at tethered device 310 in a similar manner.

Consumer application 306 may exchange data 314 using a network other than the network connectivity established by application 304 over an open Wi-Fi network, such as by using a cellular channel. Activity 308 or another activity in device 302 causes data traffic 316 to be requested over a connection using an open Wi-Fi network, which application 304 has established or may establish, as described in the operation of component 326. Similarly, Activity 312 or another activity in tethered device 310 can also cause data traffic 318 to be requested over a connection using an open Wi-Fi network, which application 304 has established or may establish, as described in the operation of component 326.

Component 320 analyzes activity data 322 or 324. Activity data 322 can be the data of an activity that has already occurred in device 302 according to scenario (i), or data that is usable to predict that an activity according to scenario (ii) will occur in device 302. Similarly, activity data 324 can be the data of an activity that has already occurred in tethered device 310 according to scenario (i), or data that is usable to predict that an activity according to scenario (ii) will occur in tethered device 310. For example, component 320 uses an NLP engine (not shown) to analyze the text of activity data 322 and determine a nature of the activity. Other types of analyzes can similarly be performed on activity data 322 or 324 as described elsewhere in this disclosure.

In some cases, a consumer application, an activity, or a nature of an activity may not be detectable with certainty through such analyses. Under such circumstances, component 326 monitors data traffic 316 or 318 occurring over an open Wi-Fi connection. An analysis of the data traffic, such as identifying a destination by reading the packet header information, determining that packet data contains unencrypted identifying information or financial information, can reveal information sufficient to adjust a risk level of the Wi-Fi connection.

For example, assume that component 326 identifies unencrypted identifying information in data traffic 316. Even though an activity, a consumer application, or a nature of the activity is not readily or reliably identifiable by component 320, component 326 can determine that data traffic 316 includes identifying information. A type of data can be another factor with which a risk level entry can be associated in risk profile 328. In other words, identifying information is a type of information, which can be associated with a risk level entry in risk profile 328.

Either through the operation of component 322, or through the operation of component 326, or both in some cases, application 304 identifies a factor for which a risk level is to be evaluated according to risk profile 328. Component 330 uses the identified factor to select a risk level using one or more entries from risk profile 328 in a manner described herein. Component 330 sets the selected or computed risk level as the risk tolerance threshold, to be used by component 364 as described herein.

Network selection subsystem 352 receives open Wi-Fi network parameters 354. Open Wi-Fi network parameters 354 include one or more parameters that an open Wi-Fi network broadcasts to any device that can detect the network. Some examples of parameters 354 include but are not limited to the Service Set Identifier (SSID) of a network, an indication of a signal strength of the network, channel number on which the network is operating, key type required to access the network, or some combination of some or all of these and other parameters depending upon the configuration of the network.

Component 356 selects one or more risk elements from a set of risk elements. In one embodiment, the selection is a default selection. In another embodiment, component 356 allows a user to select some or all of the risk elements from a list.

Component 358 selects the analysis procedures that correspond with the selected risk elements or a combination thereof. Component 358 performs the selected analysis procedures relative to a network whose parameters 354 are received as input. If an analysis procedure can be performed pre-connection, component 358 performs the analysis procedure before establishing a connection with the network. If an analysis procedure has to be performed post-connection, component 358 establishes the connection with the network, performs the analysis procedure using the network, and prevents a user activity from using the connection the risks associated with the network have been evaluated as acceptable.

Component 360 quantifies the result of an analysis procedure in the form of a risk value. Component 360 computes an overall risk value for the network. Component 360 further creates a visualization of one or more individual risk values, the overall risk value, or a combination thereof, in a manner described herein. For example, component 360 produces visualization 361, which in one example form could be a color coded indication associated with a visual representation of the network whose parameters 354 are received as input.

Component 362 reports the risks associated with the network whose parameters 354 are received as input. As one non-limiting example, component 362 produces report 363, which can be stored in a repository of open Wi-Fi network risk information that is available to other users.

Component 364 uses a risk tolerance threshold set by component 330. Just as component 330 is described to set one risk tolerance threshold, component 330 can set multiple risk tolerance thresholds for different risk elements based on one or more risk level entries in risk profile 328. Accordingly, component uses the one or more default risk tolerance thresholds set by component 330 or allows a user to set or override one or more risk tolerance thresholds.

A risk tolerance threshold is a risk value which cannot be exceeded by a value of a risk element associated with a network, or by an overall risk value of the network, or some combination thereof, if the user is to use that network. A risk tolerance threshold can be set for an individual risk element, for the overall risk value of a network, or a combination thereof.

Component 364 uses one or more risk tolerance thresholds set therein to determine whether an individual risk element or the overall risk value of a network, as the case may be, exceeds a risk tolerance threshold. If the value of an individual risk element or the overall risk value of a network exceeds a risk tolerance threshold where that value should not exceed the risk tolerance threshold, component 364 terminates a connection if one was established for a post-connection analysis procedure, or prevents a connection from establishing with the network. If the value of an individual risk element or the overall risk value of a network is equal to or less than a risk tolerance threshold, component 364 establishes connection 368 with the selected Wi-Fi network, or allows the use of the connection by activity 308, 312, and other activities in device 302 and tethered device 310, if the connection was already established for a post-connection analysis procedure.

Component 366 produces notification 367. Notification 367 identifies the network, one or more of parameters 354, a risk value of an individual risk element, an overall risk value of the network, any visualizations produced by component 360, or some combination thereof. Notification 367 can be presented to the user on the device, can be sent to the repository where report 363 is sent, can be transmitted over social media or another channel to another user, or some combination thereof.

Figure 4:
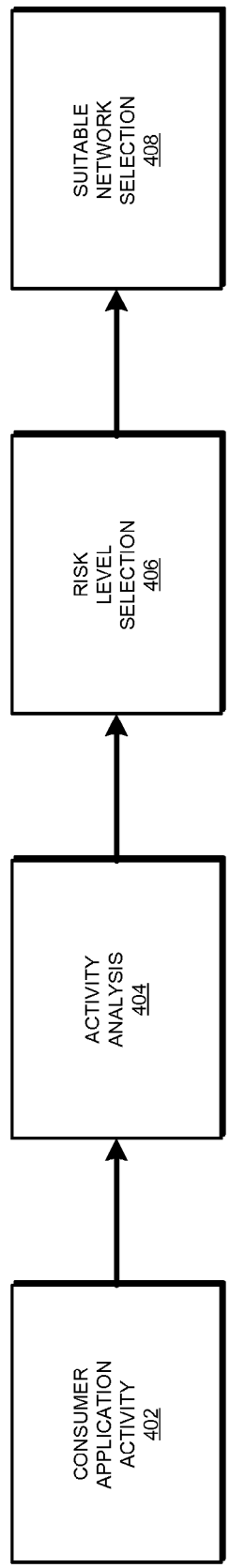
FIG. 4 depicts a block diagram of an example sequence of events when an activity precedes the establishing of a Wi-Fi connection in accordance with an illustrative embodiment.

With reference to FIG. 4, this figure depicts a block diagram of an example sequence of events when an activity precedes the establishing of a Wi-Fi connection in accordance with an illustrative embodiment. Consumer application activity 402 is an example of activity 308 or 312 in FIG. 3.

An application, such as application 304 in FIG. 3, analyzes the activity or data thereof, e.g., data 322 or 324 in FIG. 3 (404). The application selects (406) a risk level corresponding to the activity such that a risk level of a suitable Wi-Fi connection to perform the activity has to be equal to or below the selected risk level corresponding to the activity.

The application analyzes the various open Wi-Fi networks available for their risk levels or overall risk value. The application selects (408) an open Wi-Fi network whose risk level, or overall risk value, is equal to or less than the selected risk value corresponding to the activity. The application establishes a connection using the selected open Wi-Fi network.

Figure 5:
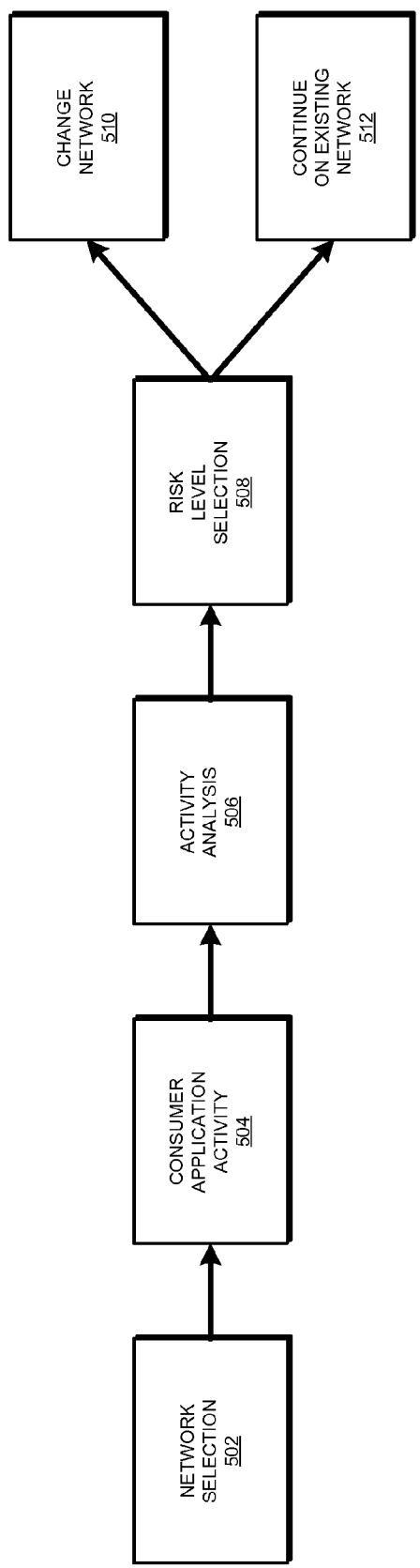
FIG. 5 depicts a block diagram of an example sequence of events when an activity precedes the establishing of a Wi-Fi connection in accordance with an illustrative embodiment.

With reference to FIG. 5, this figure depicts a block diagram of an example sequence of events when an activity precedes the establishing of a Wi-Fi connection in accordance with an illustrative embodiment. Consumer application activity 504 is an example of activity 308 or 312 in FIG. 3.

An application, such as application 304 in FIG. 3, selects (502) an open Wi-Fi network whose risk level, or overall risk value, is below a risk tolerance threshold. The application establishes a connection using the selected open Wi-Fi network.

The application detects consumer application activity (504). The application analyzes the activity or data thereof, e.g., data 322 or 324 in FIG. 3 (506). The application selects (508) a risk level corresponding to the activity such that a risk level of a suitable Wi-Fi connection to perform the activity has to be equal to or below the selected risk level corresponding to the activity.

When the risk level of the existing connection over the open Wi-Fi network selected at step 502 exceeds the risk value corresponding to the analyzed activity, the application changes (510) the open Wi-Fi network such that the risk level, or the overall risk value of the changed open Wi-Fi network is equal to or less than the risk value corresponding to the analyzed activity. When the risk level of the existing connection over the open Wi-Fi network selected at step 502 is equal to or less than the risk value corresponding to the analyzed activity, the application continues (512) using the open Wi-Fi network that was selected at step 502, and allows the activity to continue using that open Wi-Fi network.

Figure 6:
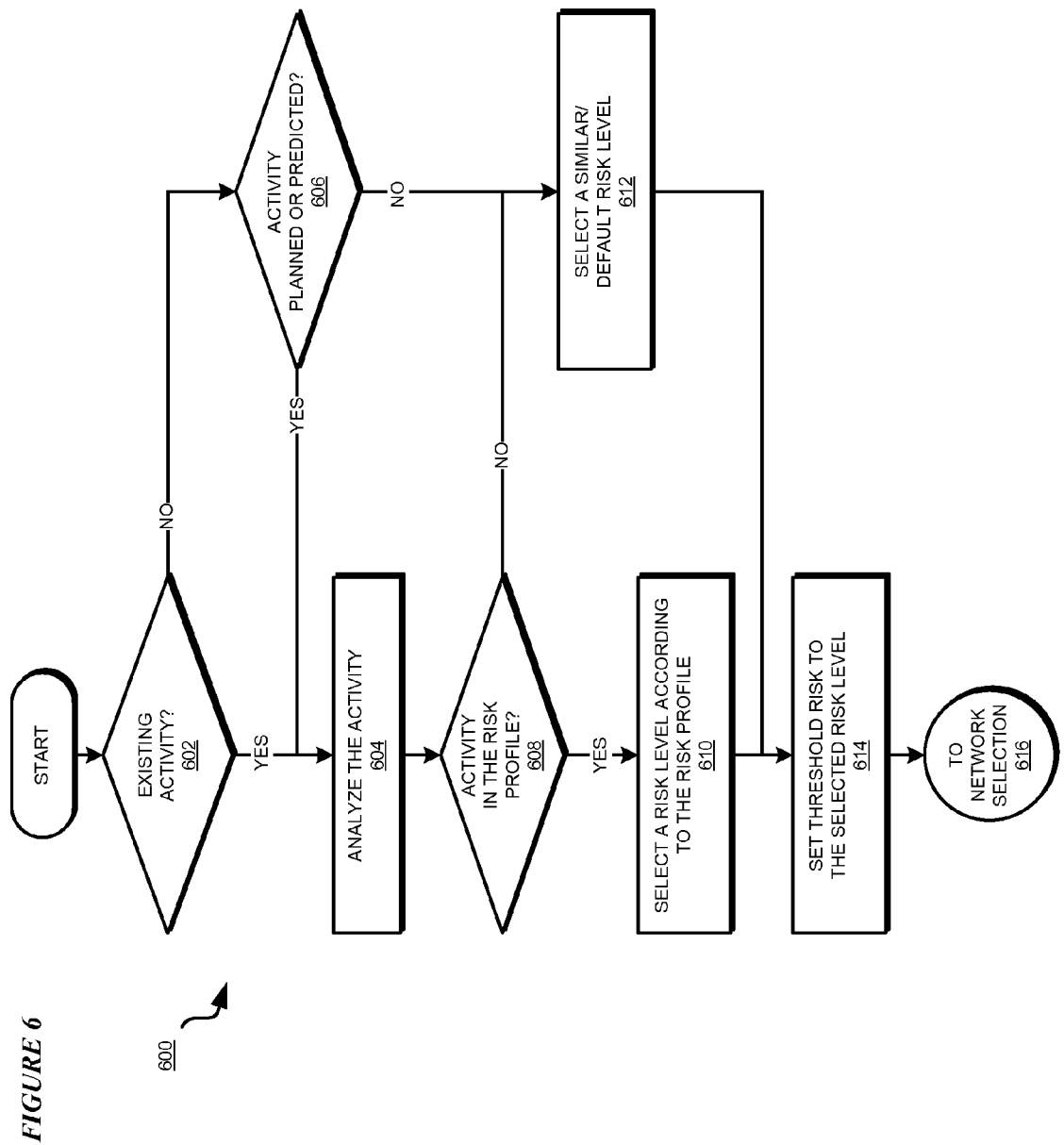
FIG. 6 depicts a flowchart of an example process for activity-based risk selection of open Wi-Fi networks in accordance with an illustrative embodiment.

With reference to FIG. 6, this figure depicts a flowchart of an example process for activity-based risk selection of open Wi-Fi networks in accordance with an illustrative embodiment. Process 600 can be implemented in application 304 in FIG. 3.

The application determines whether there is an existing activity, i.e., whether an activity has already occurred according to which an open Wi-Fi network connectivity has to be established (block 602). If there has been an existing activity ("Yes" path of block 602), the application analyzes the activity, such as by analyzing the activity data (block 604).

If an activity has not already occurred, ("No" path of block 602), the application determines whether an activity has been planned, or an activity can be predicted (block 606). If an activity is planned or predicted ("Yes" path of block 606), the application proceeds to block 604. If an activity is not planned or predicted, or cannot be determined with sufficient reliability ("No" path of block 606), the application proceeds to block 612.

The application determines whether the activity is present in some manner in a risk profile (block 608). For example, the application determines whether the consumer application of the activity, the activity, a nature or type of the activity, or a data traffic caused by the activity have one or more corresponding entries in the risk profile. If the activity is somehow represented in the risk profile ("Yes" path of block 608), the application selects a risk level according to the corresponding one or more entries in the risk profile (block 610).

If the activity is not represented in the risk profile ("No" path of block 608), the application selects a default risk level or a risk level of a look-alike activity if the look-alike activity can be identified with sufficient reliability (block 612). After selecting a risk level at block 610 or 612, the application sets a threshold risk to the selected risk level (block 614). The application then proceeds to a process for network selection (block 616), such as to process 700 in FIG. 7.

Figure 7:
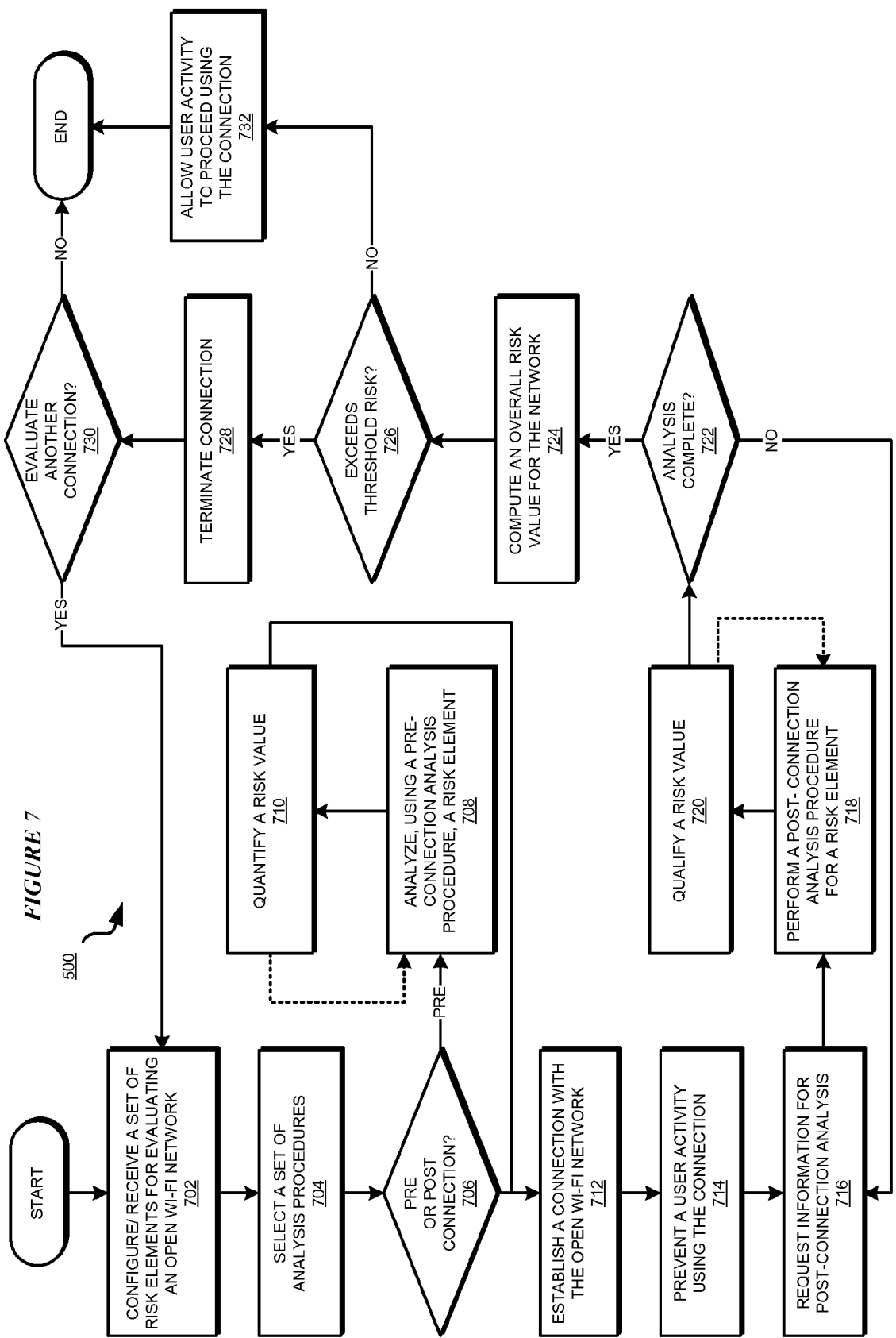
FIG. 7 depicts a flowchart of an example process for risk assessment and selection of an open Wi-Fi network in accordance with an illustrative embodiment.

With reference to FIG. 7, this figure depicts a flowchart of an example process for risk assessment and selection of an open Wi-Fi network in accordance with an illustrative embodiment. Process 700 can be implemented in application 304 in FIG. 3.

The application configures or receives a set of risk elements for evaluating an open Wi-Fi network (block 702). The application selects a corresponding set of analysis procedures to evaluate the set of risk elements (block 704).

The application determines whether any pre-connection analysis procedures have been selected (block 706). If a pre-connection analysis procedure has been selected ("Pre" path of block 706), the application analyzes a risk element of the network using a pre-connection analysis procedure (block 708). The application quantifies the result of the analysis into a risk value corresponding to the risk element (block 710). Blocks 708 and 710 are repeated as many times as needed to perform all selected pre-connection analysis procedures.

If no pre-connection analysis procedure has been selected or all pre-connection analysis procedures have been performed and a post-connection analysis procedure has to be performed ("Post" path of block 706), the application establishes a connection with the network (block 712). The application prevents a user activity from using the connection (block 714).

The application requests additional information for performing a post-connection analysis procedure as described herein (block 716). The application analyzes a risk element of the network using a post-connection analysis procedure with the additional information (block 718). The application quantifies the result of the analysis into a risk value corresponding to the risk element (block 720). Blocks 718 and 720 are repeated as many times as needed to perform all selected post-connection analysis procedures.

The application determines whether the analysis is complete (block 722). If the analysis is not complete, such as when a result of an analysis procedure warrants an additional analysis procedure that was not previously selected at block 704 ("No" path of block 722), the application returns process 700 to block 716. In one embodiment, a pre-connection analysis procedure can also be performed post-connection. If the analysis is complete ("Yes" path of block 722), the application computes an overall risk value for the network (block 724).

The application determines whether the computed overall risk value, or an individual risk value which should be within a risk tolerance threshold, exceeds the risk tolerance threshold (block 726). If the risk tolerance threshold is exceeded ("Yes" path of block 726), the application terminates a connection with the network, if one was established to perform a post-connection analysis procedure (block 728).

Note that in some cases only pre-connection analysis will be sufficient to assess the risk of a network; and in some cases only post-connection analysis will be sufficient to assess the risk of a network. Process 700 is depicted with both pre and post-connection analysis steps only for the sake of completeness and not as a limitation on the illustrative embodiments. Process 700 can be adapted by those of ordinary skill in the art accordingly, and such adaptations are contemplated within the scope of the illustrative embodiments.

The application determines whether another network should be evaluated in a similar manner (block 730). If another network has to be evaluated ("Yes" path of block 730), the application returns process 700 to block 702. If another no other network is to be evaluated ("No" path of block 730), the application ends process 700 thereafter.

Back at block 726, if the risk tolerance threshold is not exceeded ("No" path of block 726), the application establishes a connection with the network if one has not already been established for post-connection analysis, and allows user activity to proceed by using the connection (block 732). The application ends process 700 thereafter.

Figure 8:
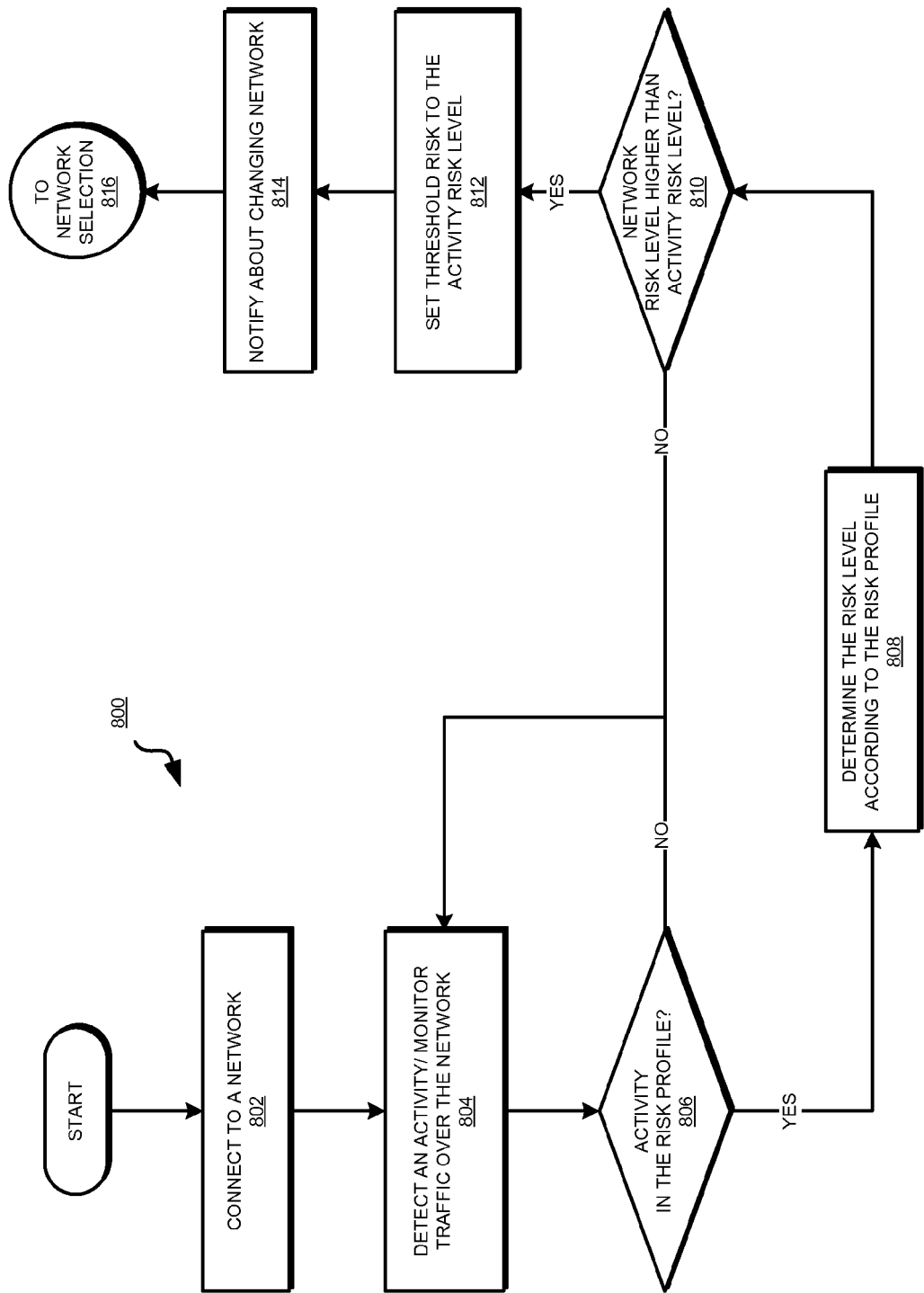
FIG. 8 depicts a flowchart of an example process for changing an existing open Wi-Fi network connection in accordance with an illustrative embodiment.

With reference to FIG. 8, this figure depicts a flowchart of an example process for changing an existing open Wi-Fi network connection in accordance with an illustrative embodiment. Process 800 can be implemented in application 304 in FIG. 3.

The application connects to a network, such as by the execution of processes 600 and 700, or by the execution of process 700 alone (block 802). The application detects an activity or data traffic attempting to use the network connected in block 802 (block 804).

The application determines whether the activity or a type of data in the data traffic is represented in a risk profile (block 806). If the activity or a type of data in the data traffic is not represented in a risk profile ("No" path of block 806), the application returns to block 804. If the activity or a type of data in the data traffic is represented in a risk profile ("Yes" path of block 806), the application determines, computes, or selects a risk level according to the risk profile (block 808).

The application determines whether a risk level of the network connected in block 802 exceeds the risk level determined in block 808 (block 810). If the risk level of the network connected in block 802 does not exceed the risk level determined in block 808 ("No" path of block 810), the application returns to block 804. If the risk level of the network connected in block 802 exceeds the risk level determined in block 808 ("Yes" path of block 810), the application sets the threshold risk to the risk level determined from the risk profile in block 808 (block 812).

The application optionally notifies a user or a consumer application that the use of the existing network by the activity or data traffic is prevented, a new and less risk-prone network is being connected with, and the activity or the data traffic will be allowed to proceed once the connection with the new network is established (block 814). The application then proceeds to a process for network selection (block 616), such as to process 700 in FIG. 7. Optionally (not shown), a user can also be allowed anytime after the determination of block 810, to override or bypass the network changing process, and continue to use the existing network of block 802.

Thus, a computer implemented method, system or apparatus, and computer program product are provided in the illustrative embodiments for activity-based risk selection of open Wi-Fi networks. Where an embodiment or a portion thereof is described with respect to a type of device, the computer implemented method, system or apparatus, the computer program product, or a portion thereof, are adapted or configured for use with a suitable and comparable manifestation of that type of device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for activity-based risk assessment of open Wi-Fi networks, the method comprising:
constructing a risk profile having a plurality of entries, each entry in the plurality of entries comprising (i) an identifier associated with a corresponding activity from a plurality of activities occurring at a mobile data communication device and (ii) a corresponding risk level tolerated by the corresponding activity when performed using the mobile data communication device, and wherein different activities tolerate different risk levels when performed using the mobile data communication device;
analyzing, using a processor in the mobile data communication device, an activity occurring at a consumer application, the plurality of activities including the activity;
determining, responsive to the analyzing, that a connection with a first open Wi-Fi network is to be used in conjunction with the activity;
determining, from an entry representing the activity in the risk profile, a risk level associated with the activity;
determining an overall risk value of the first open Wi-Fi network;
determining whether the overall risk value of the first open Wi-Fi network exceeds the risk level tolerated by the activity;
terminating, responsive to the overall risk value of the first open Wi-Fi network exceeding the risk level associated with the activity, the connection with the first open Wi-Fi network;
selecting a second open Wi-Fi network with a second overall risk value that does not exceed the risk level associated with the activity;
establishing a second connection with the second open Wi-Fi network; and
allowing the activity to proceed using the second connection with the second open Wi-Fi network;
wherein determining, from the entry representing the activity in the risk profile, the risk level associated with the activity further comprises:
determining whether the activity is represented in the entry in the risk profile;
selecting a risk level associated with the consumer application as the risk level associated with the activity responsive to determining that the activity is represented in the entry in the risk profile; and
selecting a risk level associated with a look-alike of the activity as the risk level associated with the activity responsive to determining that the activity is not represented in the entry in the risk profile;
wherein determining the overall risk value of the first open Wi-Fi network further comprises:
performing, using the processor in the mobile data communication device, a first analysis procedure configured to evaluate a first risk element associated with the first open Wi-Fi network;
determining, from a result of the first analysis procedure, a first risk value corresponding to the first risk element;
performing, by establishing a connection to the first open Wi-Fi network, a second analysis procedure configured to evaluate a second risk element associated with the first open Wi-Fi network, wherein the second analysis procedure has to be performed using the connection to the first open Wi-Fi network;
determining, from a result of the second analysis procedure, a second risk value corresponding to the second risk element; and
computing the overall risk value based upon a binary combination of the first risk value and the second risk value, wherein the binary combination comprises a value above a favorability threshold when the first risk value and the second risk value are each above the favorability threshold, and the binary combination comprises a value below the favorability threshold otherwise.

2. The method of claim 1, further comprising:
analyzing a second activity occurring at a second consumer application, to determine that the second connection with a second open Wi-Fi network is to be used in conjunction with the second activity;
determining that the second overall risk value of the second open Wi-Fi network does not exceed a second risk level associated with the second activity in the risk profile; and
allowing the second activity to proceed using the second connection with the second open Wi-Fi network.

3. The method of claim 1, further comprising:
notifying the consumer application about the terminating and the changing of the connection.

4. The method of claim 1, further comprising:
preventing access by the activity to the first open Wi-Fi network prior to the terminating.

5. The method of claim 1, further comprising:
determining whether the activity is represented in the risk profile further comprises determining whether the consumer application where the activity is performed is represented in the risk profile.

6. The method of claim 1, wherein
determining whether the activity is represented in the risk profile further comprises determining whether a type of the activity is represented in the risk profile.

7. The method of claim 1, wherein
determining whether the activity is represented in the risk profile further comprises determining whether a second activity is represented in the risk profile, the second activity being a look-alike of the activity.

8. The method of claim 1, wherein
determining whether the activity is represented in the risk profile further comprises determining whether a part of a data traffic resulting from the activity is represented in the risk profile.

9. The method of claim 1, wherein
determining whether the activity is represented in the risk profile further comprises determining whether a data used in the activity is represented in the risk profile.

10. The method of claim 1, wherein the activity has occurred prior to the connection with the first open Wi-Fi network being established.

11. The method of claim 1, wherein the activity is planned to be performed using the connection with the first open Wi-Fi network, wherein the connection is established prior to an occurrence of the activity.

12. The method of claim 1, wherein the activity is predicted to occur after establishing the connection with the first open Wi-Fi network.

13. The method of claim 1, wherein the consumer application executes in the mobile communication device.

14. The method of claim 1, wherein the consumer application executes in another device that uses the mobile communication device for data communications.

15. A computer usable program product comprising a computer readable storage device including computer usable code for activity-based risk assessment of open Wi-Fi networks, the computer usable code when executed using a processor causes steps of a method to be performed, the method comprising:
constructing a risk profile having a plurality of entries, each entry in the plurality of entries comprising (i) an identifier associated with a corresponding activity from a plurality of activities occurring at a mobile data communication device and (ii) a corresponding risk level tolerated by the corresponding activity when performed using the mobile data communication device, and wherein different activities tolerate different risk levels when performed using the mobile data communication device;
analyzing, using a processor in the mobile data communication device, an activity occurring at a consumer application, the plurality of activities including the activity;
determining, responsive to the analyzing, that a connection with a first open Wi-Fi network is to be used in conjunction with the activity;
determining, from an entry representing the activity in the risk profile, a risk level associated with the activity;
determining an overall risk value of the first open Wi-Fi network;
determining whether the overall risk value of the first open Wi-Fi network exceeds the risk level tolerated by the activity;
terminating, responsive to the overall risk value of the first open Wi-Fi network exceeding the risk level associated with the activity, the connection with the first open Wi-Fi network;
selecting a second open Wi-Fi network with a second overall risk value that does not exceed the risk level associated with the activity;
establishing a second connection with the second open Wi-Fi network; and
allowing the activity to proceed using the second connection with the second open Wi-Fi network;
wherein determining, from the entry representing the activity in the risk profile, the risk level associated with the activity further comprises:
determining whether the activity is represented in the entry in the risk profile;
selecting a risk level associated with the consumer application as the risk level associated with the activity responsive to determining that the activity is represented in the entry in the risk profile; and
selecting a risk level associated with a look-alike of the activity as the risk level associated with the activity responsive to determining that the activity is not represented in the entry in the risk profile;
wherein determining the overall risk value of the first open Wi-Fi network further comprises:
performing, using the processor in the mobile data communication device, a first analysis procedure configured to evaluate a first risk element associated with the first open Wi-Fi network;
determining, from a result of the first analysis procedure, a first risk value corresponding to the first risk element;
performing, by establishing a connection to the first open Wi-Fi network, a second analysis procedure configured to evaluate a second risk element associated with the first open Wi-Fi network, wherein the second analysis procedure has to be performed using the connection to the first open Wi-Fi network;
determining, from a result of the second analysis procedure, a second risk value corresponding to the second risk element; and
computing the overall risk value based upon a binary combination of the first risk value and the second risk value, wherein the binary combination comprises a value above a favorability threshold when the first risk value and the second risk value are each above the favorability threshold, and the binary combination comprises a value below the favorability threshold otherwise.

16. The computer usable program product of claim 15, wherein the computer usable code is transferred to the computer readable storage device over a network from a remote data processing system.

17. The computer usable program product of claim 15, wherein the computer readable storage device is associated with a server data processing system, and wherein the computer usable code is downloaded over a network from the server data processing system to a remote data processing system for use in a computer readable storage device associated with the remote data processing system.

18. A data processing system for activity-based risk assessment of open Wi-Fi networks, the data processing system comprising:
 a storage device, wherein the storage device stores computer usable program code; and
 a processor, wherein the processor executes the computer usable program code, and wherein the computer usable program code comprises:
  computer usable code for constructing a risk profile having a plurality of entries, each entry in the plurality of entries comprising (i) an identifier associated with a corresponding activity from a plurality of activities occurring at a mobile data communication device and (ii) a corresponding risk level tolerated by the corresponding activity when performed using the mobile data communication device, and wherein different activities tolerate different risk levels when performed using the mobile data communication device;
  computer usable code for analyzing, using a processor in the mobile data communication device, an activity occurring at a consumer application, the plurality of activities including the activity;
  computer usable code for determining, responsive to the computer usable code for analyzing, that a connection with a first open Wi-Fi network is to be used in conjunction with the activity;
  computer usable code for determining, from an entry representing the activity in the risk profile, a risk level associated with the activity;
  computer usable code for determining an overall risk value of the first open Wi-Fi network;
  computer usable code for determining whether the overall risk value of the first open Wi-Fi network exceeds the risk level tolerated by the activity;
  computer usable code for terminating, responsive to the overall risk value of the first open Wi-Fi network exceeding the risk level associated with the activity, the connection with the first open Wi-Fi network;
  computer usable code for selecting a second open Wi-Fi network with a second overall risk value that does not exceed the risk level associated with the activity;
  computer usable code for establishing a second connection with the second open Wi-Fi network; and
  computer usable code for allowing the activity to proceed using the second connection with the second open Wi-Fi network;
  wherein the computer usable code for determining, from the entry representing the activity in the risk profile, the risk level associated with the activity further comprises:
   computer usable code for determining whether the activity is represented in the entry in the risk profile;
   computer usable code for selecting a risk level associated with the consumer application as the risk level associated with the activity responsive to determining that the activity is represented in the entry in the risk profile; and
   computer usable code for selecting a risk level associated with a look-alike of the activity as the risk level associated with the activity responsive to determining that the activity is not represented in the entry in the risk profile;
  wherein the computer usable code for determining the overall risk value of the first open Wi-Fi network further comprises:
   computer usable code for performing, using the processor in the mobile data communication device, a first analysis procedure configured to evaluate a first risk element associated with the first open Wi-Fi network, the first risk element selected from a set of risk elements, the set of risk elements comprising (i) a type of a data carrier existing beyond an access point in the Wi-Fi network wherein the type of data carrier is selected between a cellular data network and an optical fiber based network, (ii) a geographical location of a service provider servicing the Wi-Fi network wherein the geographical location of the service provider is selected between a domestic service provider and a foreign service provider, (iii) a type of hosting of a domain name service used by the Wi-Fi network, (iv) a stability of a network signal of the Wi-Fi network, and (v) a Wi-Fi channel number used by the Wi-Fi network;
   computer usable code for determining, from a result of the first analysis procedure, a first risk value corresponding to the first risk element;
   computer usable code for performing, by establishing a connection to the first open Wi-Fi network, a second analysis procedure configured to evaluate a second risk element associated with the first open Wi-Fi network, wherein the second analysis procedure has to be performed using the connection to the first open Wi-Fi network;
   computer usable code for determining, from a result of the second analysis procedure, a second risk value corresponding to the second risk element, the second risk element selected from the set of risk elements; and
   computer usable code for computing the overall risk value based upon a binary combination of the first risk value and the second risk value, wherein the binary combination comprises a value above a favorability threshold when the first risk value and the second risk value are each above the favorability threshold, and the binary combination comprises a value below the favorability threshold otherwise.

* * * * *